United States Patent
You et al.

(10) Patent No.: US 11,316,945 B2
(45) Date of Patent: Apr. 26, 2022

(54) VEHICLE MULTIMEDIA SYSTEM AND MEMORY MANAGEMENT METHOD THEREFOR

(71) Applicants: Hyundai Motor Company, Seoul (KR); Kia Motors Corporation, Seoul (KR)

(72) Inventors: Hye Won You, Seoul (KR); Dae Bong An, Seongnam-si (KR); Hyung Jin Kim, Incheon (KR)

(73) Assignees: Hyundai Motor Company, Seoul (KR); Kia Motors Cornoration, Seoul (KR)

( * ) Notice: Subject to any disclaimer, the term of this patent is extended or adjusted under 35 U.S.C. 154(b) by 0 days.

(21) Appl. No.: 16/987,986

(22) Filed: Aug. 7, 2020

(65) Prior Publication Data
US 2021/0185143 A1 Jun. 17, 2021

(30) Foreign Application Priority Data
Dec. 16, 2019 (KR) .......................... 10-2019-0168067

(51) Int. Cl.
| | | |
|---|---|---|
| G06F 13/00 | (2006.01) | |
| H04L 67/568 | (2022.01) | |
| H04L 65/60 | (2022.01) | |
| H04L 65/401 | (2022.01) | |
| H04L 67/50 | (2022.01) | |
| H04L 47/70 | (2022.01) | |

(52) U.S. Cl.
CPC .......... *H04L 67/2842* (2013.01); *H04L 47/82* (2013.01); *H04L 65/4023* (2013.01); *H04L 65/601* (2013.01); *H04L 67/22* (2013.01)

(58) Field of Classification Search
CPC ... H04L 67/2842; H04L 65/601; H04L 67/22; H04L 47/82; H04L 65/4023; H04L 67/12; H04W 4/40; H04W 4/44
USPC ....... 709/231, 230, 235, 217–219, 215, 213; 711/129, 118, 117, 153, 173; 707/916
See application file for complete search history.

(56) References Cited

U.S. PATENT DOCUMENTS

| | | | |
|---|---|---|---|
| 5,671,389 A | 9/1997 | Saliba | |
| 9,967,305 B2* | 5/2018 | Braness | ................ H04L 65/607 |
| 10,346,939 B1* | 7/2019 | Nucci | ................. H04L 67/2842 |
| 10,555,027 B2* | 2/2020 | Karlsson | ................ H04H 20/62 |
| 10,678,690 B2* | 6/2020 | Hower | ................ G06F 12/0842 |
| 2012/0054442 A1* | 3/2012 | Walker | ................ G06F 12/0848 |
| | | | 711/128 |
| 2015/0006662 A1* | 1/2015 | Braness | ................ H04L 65/607 |
| | | | 709/213 |
| 2017/0078729 A1* | 3/2017 | Karlsson | ................ H04L 67/12 |
| 2019/0065374 A1* | 2/2019 | Hower | ................. G06F 12/023 |
| 2019/0243762 A1* | 8/2019 | Birke | ................. G06F 9/45533 |

FOREIGN PATENT DOCUMENTS

JP 3789183 B2 6/2006

* cited by examiner

*Primary Examiner* — Kenneth R Coulter
(74) *Attorney, Agent, or Firm* — Slater Matsil, LLP

(57) ABSTRACT

A method for managing a memory of a vehicle multimedia system includes analyzing a use rate per streaming service, allocating a partition of a memory per streaming service according to the analyzed use rate, compressing streaming data when the streaming data is downloaded, and caching the compressed streaming data in a partition allocated for a specific streaming service corresponding to the streaming data.

18 Claims, 6 Drawing Sheets

VEHICLE MULTIMEDIA SYSTEM AND MEMORY MANAGEMENT METHOD THEREFOR

CROSS-REFERENCE TO RELATED APPLICATIONS

This application claims the benefit of Korean Patent Application No. 10-2019-0168067, filed on Dec. 16, 2019, which application is hereby incorporated herein by reference.

TECHNICAL FIELD

The present invention relates to a vehicle multimedia system and a memory management method therefor.

BACKGROUND

More enhanced music playback environments during vehicle driving have recently been increasingly required, and a method of acquiring sound sources through a media streaming service rather than a method by which a driver prepares a sound source recording medium such as a compact disc (CD) is gradually preferred with the development of communication technology.

Media streaming types may include music streaming for music playback and Internet radio for playing sound sources according to categories (economics, children, literature, society, etc.) other than music, which are categorized according to property of content provided by content providers.

In general, caching is applied to multimedia systems that provide such a media streaming service. Caching refers to storing data downloaded from content sources such as a server or a copy of calculated result values. Caching improves an application processing speed when the same operation is performed later by retrieving previously stored cached data instead of acquiring data from a content source. Particularly, in sound source playback, if cached sound source data is present, caching does not require download of audio data from a server for playback of the corresponding sound source, and thus can reduce data fees. Furthermore, uninterrupted sound source playback can also be performed using cached data in a situation in which communication is not smoothly performed (for example, a situation of entering a shadow area).

However, since the number of content providers (CPs) increases although memory (e.g., embedded multimedia controller (eMMC)) capacity of a vehicle multimedia system is limited, there is a problem that it is difficult for content providers (CPs) to secure separate memory spaces for cached data (i.e., partitions for caching).

SUMMARY

The present invention relates to a vehicle multimedia system and a memory management method therefor. Particular embodiments relate to a vehicle multimedia system and a memory management method therefor which can efficiently manage a cached data storage space in consideration of a service use state of a user.

An embodiment of the present invention provides a vehicle multimedia system and a memory management method therefor which can efficiently allocate partitions for caching to a limited memory of a multimedia system in an environment supporting various content providers.

It will be appreciated by persons skilled in the art that the features that could be achieved with the present invention are not limited to what has been particularly described herein and the above and other features that the present invention could achieve will be more clearly understood from the following detailed description.

A method for managing a memory of a vehicle multimedia system according to an embodiment of the present invention includes analyzing a use rate per streaming service, allocating a partition of a memory per streaming service according to the analyzed use rate, compressing streaming data when the streaming data is downloaded, and caching the compressed streaming data in a partition allocated for a streaming service corresponding to the streaming data.

Furthermore, a vehicle multimedia playback apparatus according to an embodiment of the present invention includes a memory, a controller for allocating a partition of the memory per streaming service according to a use rate per streaming service, and a communication unit for downloading streaming data, wherein the controller performs control such that the streaming data is compressed when the streaming data is acquired through the communication unit and the compressed streaming data is cached in a partition allocated for a streaming service corresponding to the streaming data.

It is possible to efficiently manage a limited memory space according to a use pattern through the vehicle multimedia system and the memory management method therefor according to at least one embodiment of the present invention, configured as described above.

It will be appreciated by persons skilled in the art that the effects that can be achieved with the present invention are not limited to what has been particularly described hereinabove and other advantages of the present invention will be more clearly understood from the following detailed description.

DETAILED DESCRIPTION OF ILLUSTRATIVE EMBODIMENTS

Figure 1A:
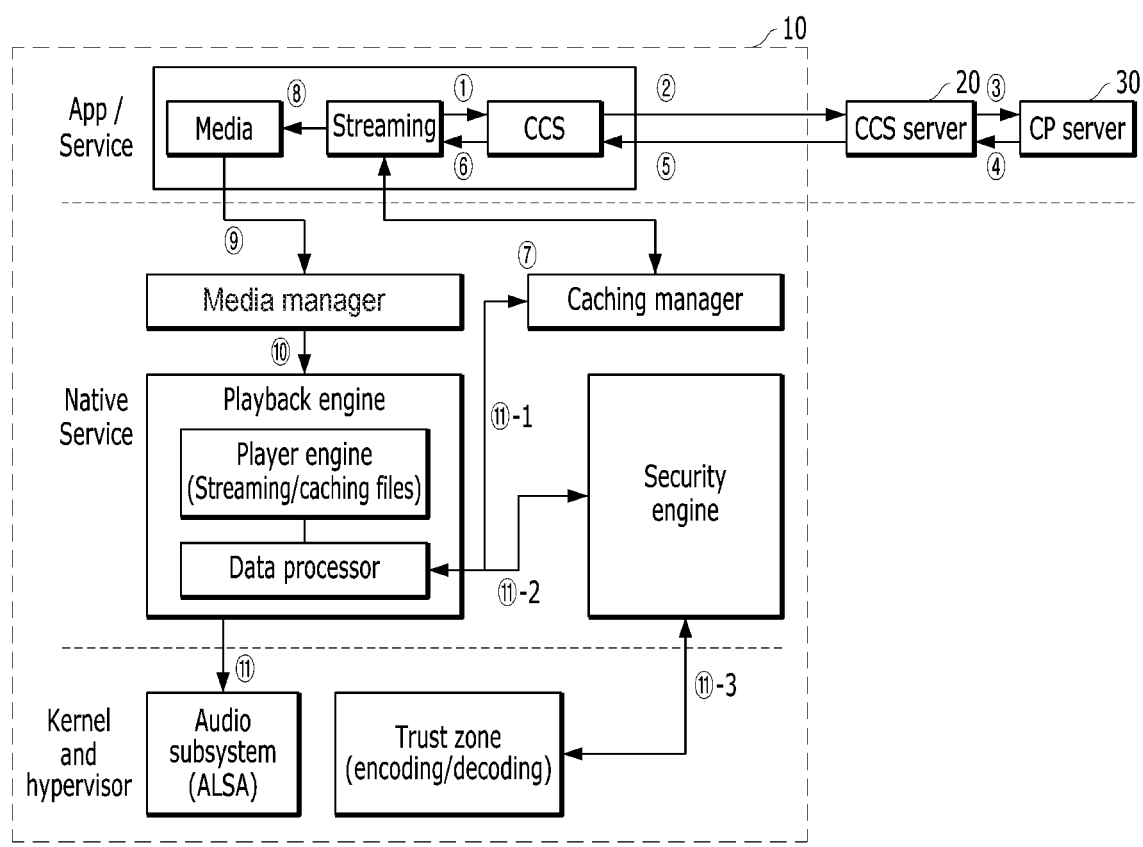
FIG. 1A is a block diagram showing an example of a configuration of a vehicle multimedia system according to an embodiment of the present invention.

The detailed description of exemplary embodiments of the present invention will be given to enable those skilled in the art to implement and practice the invention with reference to the attached drawings. However, the present invention can be implemented in various different forms and is not limited to embodiments described herein. In addition, parts that are not related to the description will be omitted for clear description in the drawings, and the same reference numbers will be used throughout this specification to refer to the same or like parts.

Through the specification, when it is said that some part "includes" a specific element, this means that the part may further include other elements, not excluding them, unless otherwise mentioned. Further, the same reference numbers will be used to refer to the same parts throughout this specification.

In an embodiment of the present invention, to efficiently allocate partitions for caching to a limited memory of a multimedia system in an environment supporting various content providers, a use pattern per content provider is determined in units of user and a cached data compression rate and a partition allocation form are determined on the basis of the use pattern.

First, a system configuration applicable to embodiments will be described with reference to FIGS. 1A and 1B.

FIG. 1A is a block diagram showing an example of a configuration of a vehicle multimedia system according to an embodiment of the present invention.

Referring to FIG. 1A, a vehicle multimedia system applicable to embodiments may include an audio/video navigation (AVN) system 10, a connected car service (CCS) server 20, and a content provider (CP) server 30.

The CCS server 20 can execute a function of transmitting a content request of the AVN system 10 to the CP server 30 and a function of transmitting content data provided by the CP server 30 to the AVN system 10 between the AVN system 10 of the vehicle and the CP server 30. For example, the CCS server 20 may be managed by a vehicle manufacturer but the present invention is not limited thereto.

Further, although a single CP server 30 is illustrated in FIG. 1A, content providers may individually operate servers. In this case, the CCS server 20 may be connected to a plurality of content provider servers to provide a connected car service to the AVN system 10 of the vehicle.

In FIG. 1A, components of the AVN system 10 are illustrated in a hierarchical structure. For example, an application/service layer corresponding to an upper layer may include a media service, a streaming service, and a connected car service (CCS). A native service layer corresponding to a middle layer may include a media manager, a playback engine, a caching manager, and a security engine. Further, a kernel and hypervisor layer corresponding to a lower layer may include an audio subsystem (Advanced Linux Sound Architecture (ALSA)) and a trust zone.

The aforementioned hierarchical structure of the AVN system 10 is exemplary and it is obvious to those skilled in the art that the AVN system 10 may include more or fewer components in actual implementation.

Hereinafter, a sound source playback process will be described with reference to FIG. 1A.

When a user inputs a sound source playback command, the streaming service sends a request for sound source playback to the CCS service (①) and the CCS service transfers the request to the CCS server 20 (②). The CCS server 20 transfers the sound source playback request to the CP server 30 (③), and the CP server 30 transmits response data to the request to the CCS server 20 (④).

Here, the response data may include information about the sound source required to be played in the AVN system 10, for example, resource information (play_uri: Uniform Resource Identifier) of playback data, an artist name, album art, a song name, lyrics, etc.

The response data is transmitted from the CCS server 20 to the streaming service (⑥) via the CCS service (⑤). The streaming service can determine whether prestored cached data corresponding to the sound source is present in the caching manager or whether the sound source needs to be downloaded through streaming on the basis of the resource information included in the response data (⑦).

The streaming service notifies the media service whether the sound source requested to be played can be played using cached data or through streaming (⑧), and the media service transfers this information to the media manager (⑨) such that playback of the sound source is prepared in the playback engine (⑩).

The playback engine causes a data processor to perform processing, parsing, decoding, and the like on streaming data according to whether streaming/cached data is used for the sound source and transmits pulse code modulation (PCM) data provided through the aforementioned processing to the audio subsystem (⑪).

The data processor of the playback engine can request file caching of the caching manager (⑪-1) and transmit a file route for encoding or decoding a sound source file to the trust zone through a security engine (⑪-2 and ⑪-3).

Here, allocation and management of a storage space according to embodiments of the present invention may correspond to a caching management function of the native service layer.

Figure 1B:
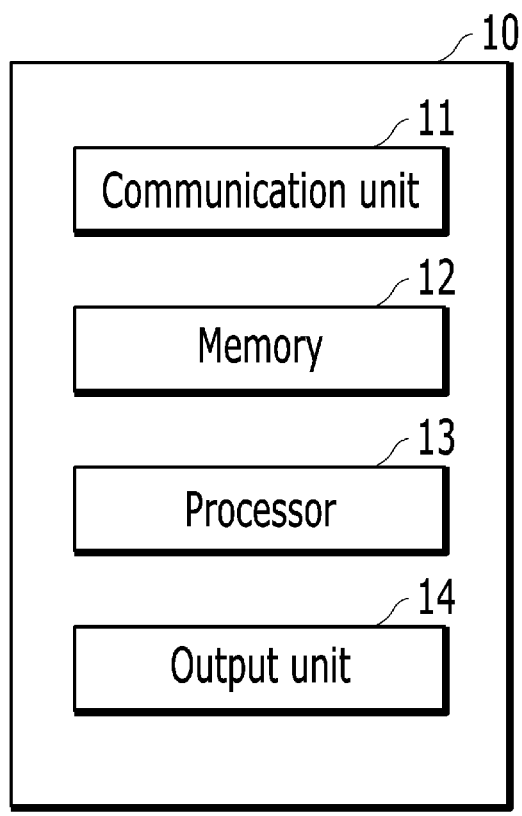
FIG. 1B is a block diagram showing an example of a configuration of an audio/video navigation (AVN) system constituting the vehicle multimedia system.

FIG. 1B is a block diagram showing an example of a configuration of the AVN system constituting the vehicle multimedia system. FIG. 1B illustrates the configuration of the AVN system 10 shown in the hierarchical structure in FIG. 1A in the form of a device configuration.

Referring to FIG. 1B, the AVN system 10 may include a communication unit 11, a memory 12, a processor 13, and an output unit 14.

The communication unit 11 can provide a function of wirelessly communicating with the CCS server 20 for the streaming service and may support short-range wireless communication protocols (e.g., Wi-Fi Direct, Bluetooth, etc.) for communication with a smart device carried by a user in the vehicle. Further, the communication unit 11 may also support vehicle communication protocols for communication with other controllers in the vehicle.

The memory 12 may execute a function of buffering data transmitted from the communication unit 11, input/output data of the processor 13, and data to be output through the output unit 14. Particularly, the memory 12 can provide partitions for storing cached data of content downloaded through a media streaming service with respect to the present embodiment. For example, the memory 12 may include the eMMC as described above, but the present invention is not limited thereto.

The output unit 14 can execute a function of outputting played media content in the form of visual information, auditory information or a combination thereof according to content form through an output terminal, a speaker, a display, and the like.

The processor 13 may be referred to as a "controller" and can perform determinations, decisions, arithmetic operations, and the like necessary for operations of the aforementioned components. For example, the processor 13 can control the overall process of playing a sound source requested by a user and, particularly, analyze a use pattern of the user for each content provider and determine a data compression rate and a memory allocation method for each content provider on the basis of the analysis result.

Hereinafter, a memory allocation process according to an embodiment on the basis of the above-described system configuration will be described with reference to FIGS. 2 to 5.

Figure 2:
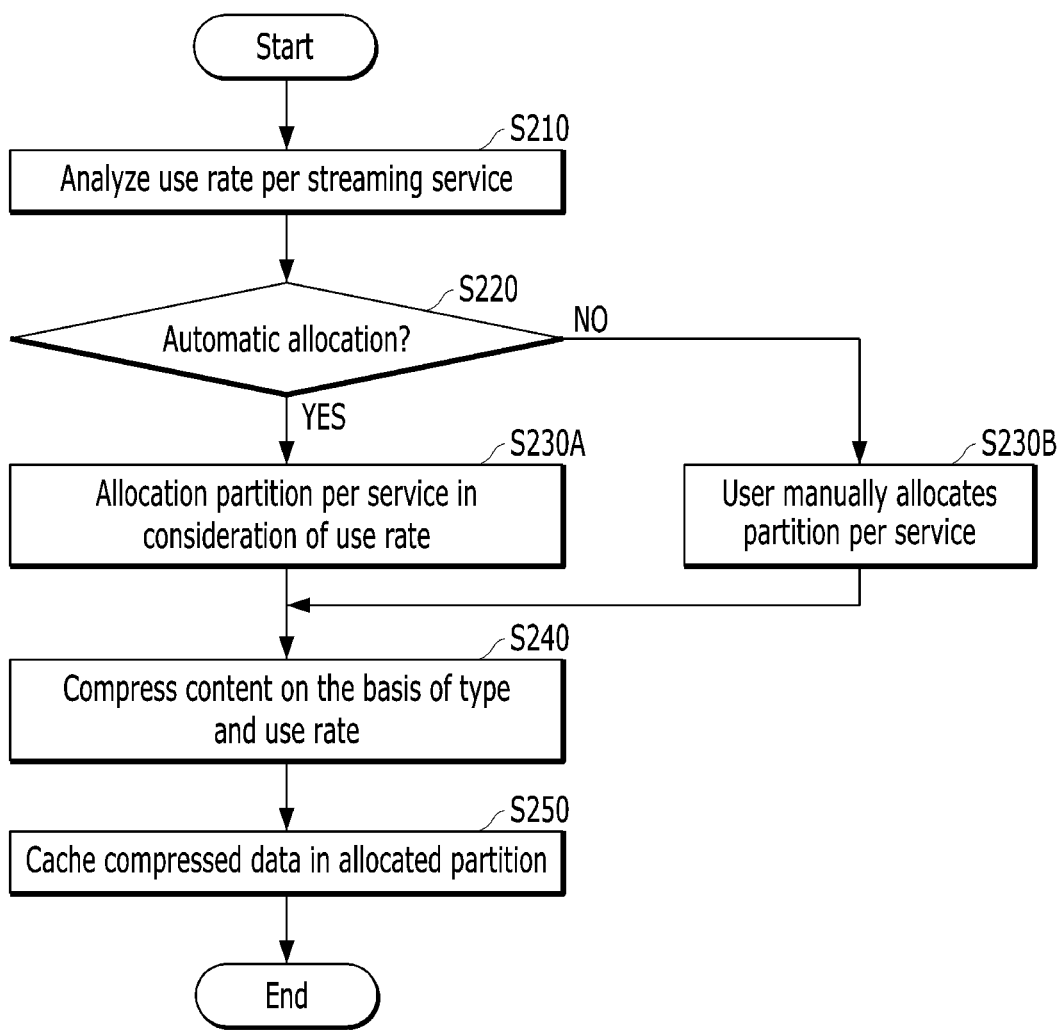
FIG. 2 is a flowchart showing an example of a memory allocation process in a single driver environment according to an embodiment of the present invention.
Figure 3:
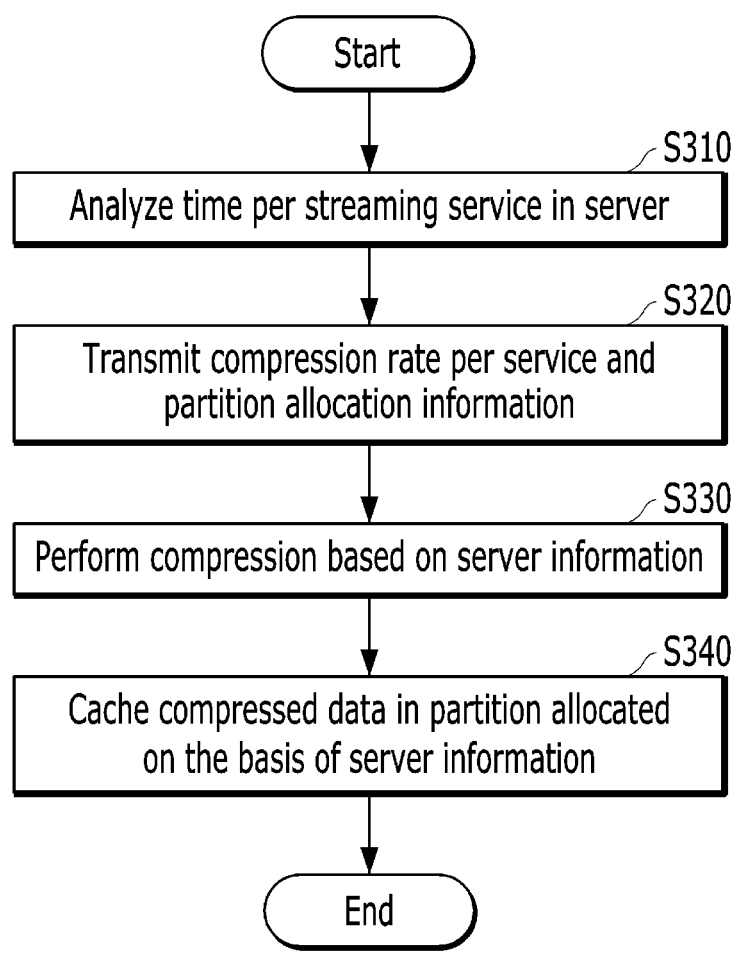
FIG. 3 is a flowchart showing an example of a memory allocation process based on server determination in a single driver environment according to an embodiment of the present invention.
Figure 4:
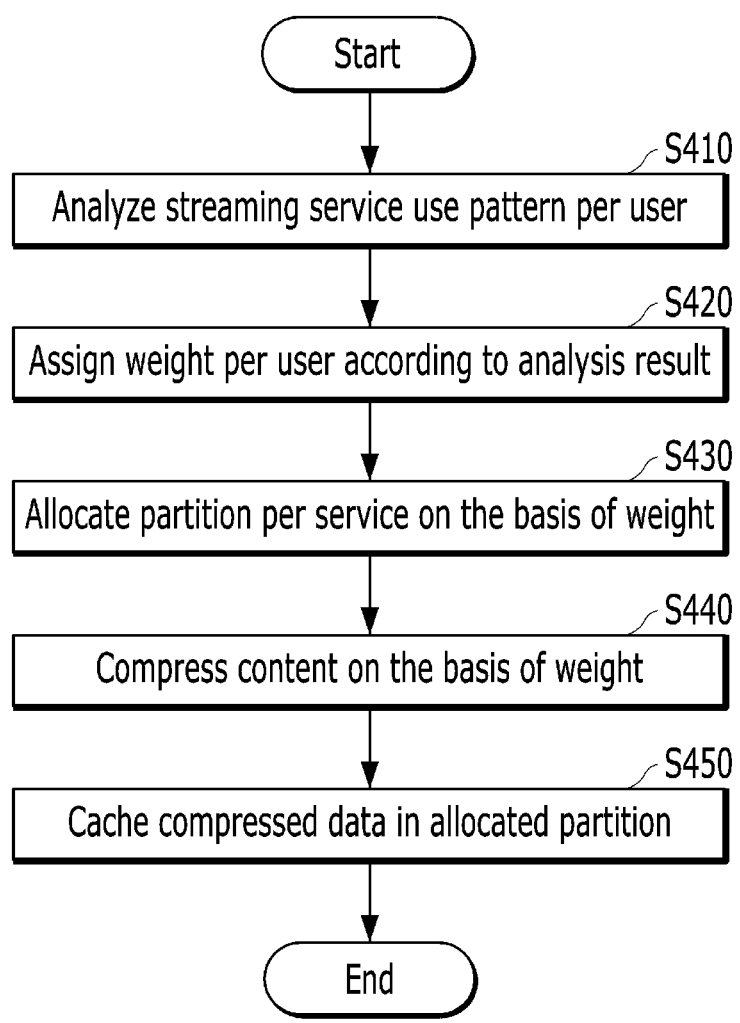
FIG. 4 is a flowchart showing an example of a memory allocation process in a multi-driver environment according to an embodiment of the present invention.
Figure 5:
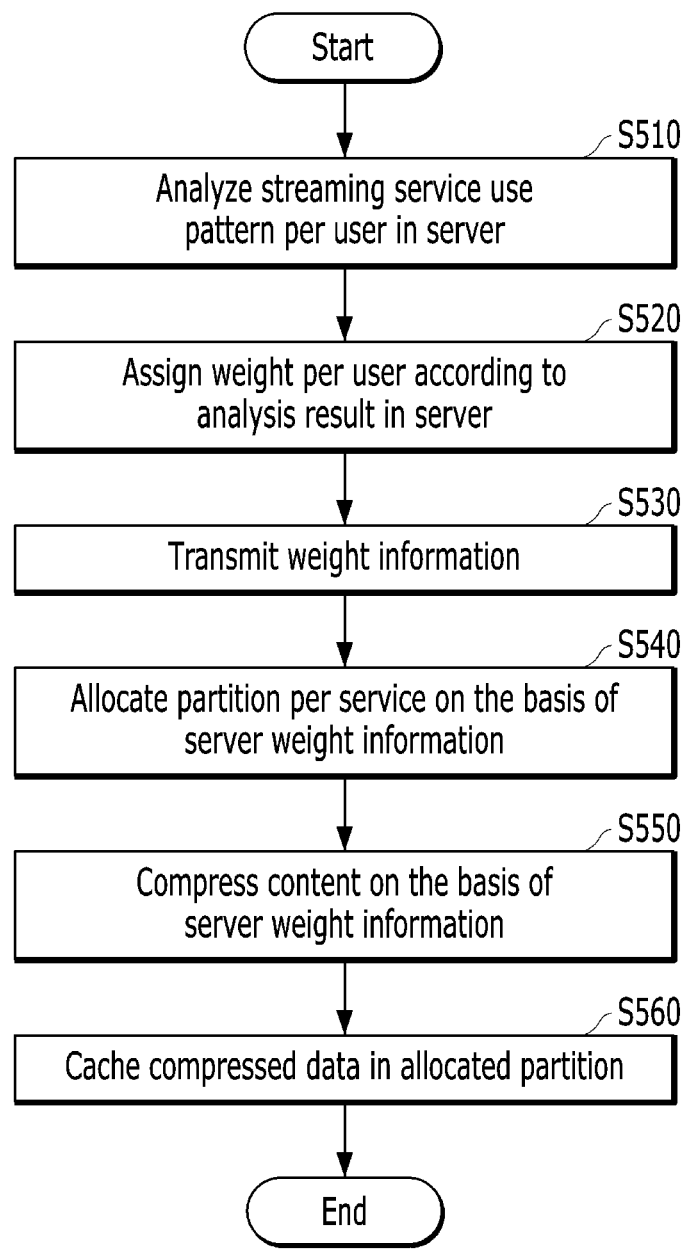
FIG. 5 is a flowchart showing an example of a memory allocation process based on server determination in a multi-driver environment according to an embodiment of the present invention.

A single user is assumed in FIGS. 2 and 3 and multiple users are assumed in FIGS. 4 and 5.

FIG. 2 is a flowchart showing an example of a memory allocation process in a single driver environment according to an embodiment of the present invention.

Referring to FIG. 2, a use rate per streaming service can be analyzed in the AVN system 10 (S210). Here, the use rate per streaming service may refer to a use rate per category (music, economics, children, literature, society, or the like) of a streaming service or a use rate per content provider (CP) irrespective of category. Further, a use rate may mean a playback time accumulated per service or in units of predetermined period, or content data capacity accumulated per service or in units of predetermined period.

A user can select whether a memory partition will be automatically allocated through the AVN system 10 (S220). When automatic allocation is selected (YES in S220), the processor 13 can allocate a partition to be used to store cached data per service on the basis of an analyzed use rate (S230A). For example, on the assumption that a total memory space for cached data is 1 GB, when the user listened to a sound source from a content provider A for a time corresponding to 75% of total hours of use and listened to a sound source from a content provider B for the remaining time corresponding to 25%, 750 MB can be allocated as a partition for storing cached data of the content provider A and 250 MB can be allocated as another partition for storing cached data of the content provider B. If a predetermined minimum margin space (e.g., 200 MB) for another service is reserved in the memory space, 600 MB may be allocated as a partition for storing cached data of the content provider A and 200 MB may be allocated as another partition for storing cached data of the content provider B. This allocation method is exemplary and the present invention is not limited thereto. According to another embodiment, an allocation ratio may also be changed according to a data format of a streaming service. For example, in the case of a video streaming service, a larger storage space may be allocated than for a sound source streaming service for the same hours of use.

If the user selects manual allocation (NO in S220), a menu by which the user can set a partition for storing cached data per service may be provided (S230B).

When content data downloaded through streaming is present after a partition is allocated, a compression rate for the data may be determined on the basis of at least one of the type and use rate of the data (S240). For example, different compression rates may be applied to content types of text, an image or audio content. Further, in the case of content downloaded through a streaming service having a high use rate, cached data is highly likely to be frequently used and thus a compression rate can be increased in order to reduce a decompression time. In addition, content data corresponding to a service having a relatively low use rate is highly unlikely to be frequently used, and thus a high compression rate can be applied thereto such that the content data occupies small capacity.

Upon completion of compression, the compressed data can be cached in the partition allocated to the service corresponding to the content (S250).

FIG. 3 is a flowchart showing an example of a memory allocation process based on server determination in a single driver environment according to an embodiment of the present invention.

Referring to FIG. 3, a use rate per streaming service can be analyzed in the CCS server 20 unlike in FIG. 2 (S310). Here, the meanings of "use rate" and "use rate per streaming service" and the partition allocation method have been described above with reference to FIG. 2 and thus redundant description will be omitted.

The server 20 transmits a compression rate per service and partition allocation information according to analysis results to the AVN system 10 (S320). Although this process may be periodically performed, the present invention is not limited thereto. For example, this process may be performed at the request of the AVN system 10.

The AVN system 10 can apply different compression rates to content on the basis of the compression rate information per service acquired from the server (S330).

Upon completion of compression, compressed data can be cached in a partition allocated to the service corresponding to the content from among partitions allocated to respective services according to the partition allocation information acquired from the server (S340).

A situation in which multiple users are present is assumed with reference to FIGS. 4 and 5.

FIG. 4 is a flowchart showing an example of a memory allocation process in a multi-driver environment according to an embodiment of the present invention.

Referring to FIG. 4, a streaming service use pattern per user can be analyzed in the AVN system 10 (S410). Here, the streaming service use pattern per user may mean that a total streaming data use amount per user or a total streaming service use time per user is analyzed for different periods. For example, a streaming service use amount per user may be analyzed for different aggregation periods such as daily/weekly/monthly periods.

On the basis of this analysis result, the AVN system 10 can assign a weight per user (S420). For example, if user 1 mainly uses a streaming service for five days a week and user 2 mainly uses the streaming service for two days of a weekend, although main users are changed on a daily basis, the amount of data used by user 2 for two days of a weekend may be larger than the amount of data used by user 1 for five days a week on a weekly basis. In this case, a higher weight may be assigned to user 2 in consideration of a total amount of data or a higher weight may be assigned to user 1 with higher frequency of use.

Upon determination of weights, the AVN system 10 can allocate a partition per service on the basis of a weight per user (S430). For example, if the weight of user 1 is 1 and the weight of user 2 is 2, a weight of 1 may be assigned to each streaming service used by user 1 and a weight of 2 may be assigned to each streaming service used by user 2. That is, if user 1 uses service A and service B in the ratio of 1:3, 1 point is assigned to service A and 3 points are assigned to service B. If user 2 uses service A and service C in the ratio of 1:3, 2 points are assigned to service A and 6 points are assigned to service C. Consequently, when scores of the two users per service are summed, service A has 3 points, service B has 3 points and service C has 6 points. Accordingly, partitions can be allocated in the ratio of A:B:C=1:1:2.

Then, compression of each content can be performed using a weight per user (S440). This process is similar to step S240 described above with reference to FIG. 2 but differs therefrom in that weights are additionally considered. That is, a compression rate per service in response to a partition allocation rate determined in step S430 can be additionally applied in addition to a basic compression rate according to content type.

Upon completion of compression, compressed data can be cached in a partition allocated for a service corresponding to the content (S450).

FIG. 5 is a flowchart showing an example of a memory allocation process based on server determination in a multi-driver environment according to an embodiment of the present invention.

Referring to FIG. 5, a use rate per user and per streaming service can be analyzed in the CCS server 20 unlike in FIG. 4 (S510) and a weight per user can be assigned on the basis of the analysis result (S520). Here, a use rate analysis form and a weight assignment method have been described above in steps S410 and S420 of FIG. 4 and thus redundant description will be omitted.

The CCS server 20 transmits weight information according to analysis results to the AVN system 10 (S530). The AVN system 10 may allocate a partition per service on the basis of the weight information acquired from the server (S540) and apply different compression rates for respective pieces of content on the basis of the weight information (S550).

Upon completion of compression, compressed data can be cached in a partition allocated for a service corresponding to the content from among partitions allocated to respective services (S560).

According to the partition allocation methods described above, partition allocation can be dynamically managed by periodically resetting a criterion for determination (a weight per user, a use rate per streaming service, etc.).

Since partitions for caching are efficiently set within a fixed memory space through the above-described dynamic caching space allocation method, frequent writing/deletion due to an insufficient partition for a specific service can be prevented and thus memory lifespan increase can be expected. Furthermore, since a relatively large space is allocated to a user and a service which mainly use a streaming service, a larger amount of cached data can be stored therein and thus data fees can be saved and a stable service can be used uninterrupted even in a shadow area.

The above-described embodiments of the present invention can be realized as computer-readable code in a medium in which a program is recorded. Computer-readable media include all kinds of recording devices in which data readable by computer systems is stored. Examples of computer-readable media include a hard disk drive (HDD), a solid state drive (SSD), a silicon disk drive (SDD), a ROM, a RAM, a CD-ROM, a magnetic tape, a floppy disk, an optical data storage device, etc.

The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method for managing a memory of a vehicle multimedia system, the method comprising:
    analyzing a use rate per streaming service;
    allocating a partition of the memory per streaming service according to the analyzed use rate;
    compressing streaming data when the streaming data is downloaded, wherein compressing the streaming data comprises applying different compression rates according to streaming data types; and
    caching the compressed streaming data in the partition allocated for a specific streaming service corresponding to the streaming data.

2. The method of claim 1, wherein compressing the streaming data is also based on the analyzed use rate.

3. The method of claim 1, further comprising allocating the partition of the memory per streaming service according to selection of a user when the user selects manual segmentation.

4. The method of claim 1, wherein analyzing the use rate per streaming service is performed in an audio/video navigation (AVN) system or a connected car service server which relays from the AVN system to a content providing server.

5. The method of claim 4, wherein analyzing the use rate per streaming service is performed in the connected car service server, the method further comprising transmitting information about the analyzed use rate per streaming service from the connected car service server to the AVN system.

6. The method of claim 1, wherein analyzing the use rate per streaming service comprises analyzing the use rate per streaming service when a plurality of users is present, and further comprises:
    analyzing a streaming service use pattern per user; and
    assigning a weight per user based on the streaming service use pattern per user.

7. The method of claim 6, wherein allocating the partition and compressing the streaming data are performed in additional consideration of the assigned weight per user.

8. The method of claim 6, wherein analyzing the streaming service use pattern per user comprises performing analysis for a plurality of different aggregation periods.

9. A non-transitory computer readable recording medium storing a program for executing the method for managing the memory of the vehicle multimedia system according to claim 1.

10. A vehicle multimedia playback apparatus, comprising:
    a memory;
    a controller configured to allocate a partition of the memory per streaming service according to a use rate per streaming service; and
    a communication unit configured to download streaming data,
    wherein the controller is configured to perform control such that the streaming data is compressed when the streaming data is acquired through the communication unit and the compressed streaming data is cached in the partition allocated for a specific streaming service corresponding to the streaming data, the controller applying different compression rates for streaming data types.

11. The apparatus of claim 10, wherein the controller is configured to additionally consider the use rate per streaming service in application of the compression rates.

12. The apparatus of claim 10, wherein the controller is configured to allocate the partition per streaming service according to selection of a user when the user selects manual segmentation.

13. The apparatus of claim 10, wherein the vehicle multimedia playback apparatus is configured to analyze the use rate per streaming service.

14. The apparatus of claim 10, wherein:
    a connected car service server is configured to analyze the use rate per streaming service;

the connected car service server is configured to mediate between the vehicle multimedia playback apparatus and a content providing server; and the communication unit is configured to obtain information about the analyzed use rate per streaming service from the connected car service server and provide the information to the vehicle multimedia playback apparatus.

15. The apparatus of claim 10, wherein the use rate per streaming service includes a streaming service use pattern per user of a plurality of users and a weight per user assigned based on the streaming service use pattern per user.

16. The apparatus of claim 15, wherein the controller is configured to perform allocation of the partition and the compression in additional consideration of the assigned weight per user.

17. The apparatus of claim 15, wherein the streaming service use pattern per user is analyzed for a plurality of different aggregation periods.

18. A method for managing a memory of a vehicle multimedia system, the method comprising:

analyzing a use rate per streaming service for a plurality of users;

analyzing a streaming service use pattern per user;

assigning a weight per user based on the streaming service use pattern per user;

allocating a partition of the memory per streaming service according to the analyzed use rate and the assigned weight per user;

compressing streaming data when the streaming data is downloaded by applying different compression rates according to streaming data types, wherein compressing the streaming data comprises applying the different compression rates according to streaming data types; and caching the compressed streaming data in the partition allocated for a specific streaming service corresponding to the streaming data.

* * * * *

UNITED STATES PATENT AND TRADEMARK OFFICE
CERTIFICATE OF CORRECTION

| | |
|---|---|
| PATENT NO. | : 11,316,945 B2 |
| APPLICATION NO. | : 16/987986 |
| DATED | : April 26, 2022 |
| INVENTOR(S) | : You et al. |

It is certified that error appears in the above-identified patent and that said Letters Patent is hereby corrected as shown below:

On the Title Page

Item (73), Line 2, Assignees; delete "Cornoration" and insert --Corporation--.

Signed and Sealed this
Twenty-fourth Day of January, 2023

Katherine Kelly Vidal
*Director of the United States Patent and Trademark Office*